T. STAMATSON.
AUTOMATIC SIGNALING DEVICE.
APPLICATION FILED OCT. 15, 1915.
1,205,283.
Patented Nov. 21, 1916.
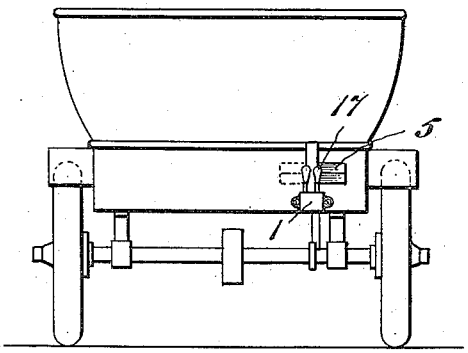
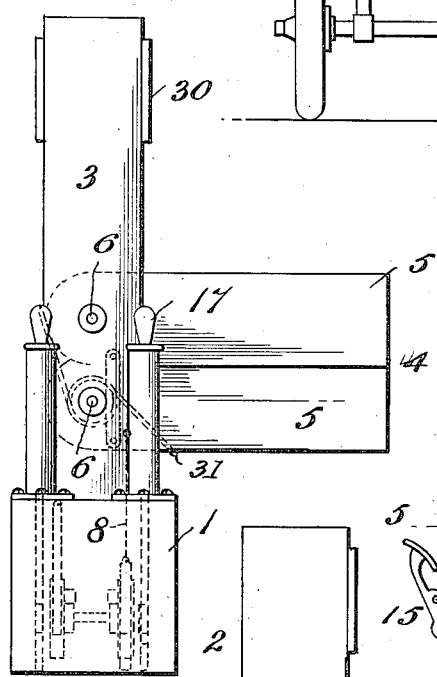
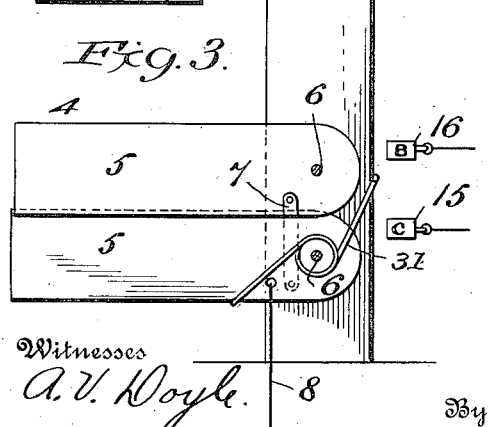
Witnesses
A. V. Doyle
Inventor
T. Stamatson
By Victor J. Evans
Attorney

UNITED STATES PATENT OFFICE.

THOMAS STAMATSON, OF BROOKLYN, NEW YORK.

AUTOMATIC SIGNALING DEVICE.

1,205,283.

Specification of Letters Patent.

Patented Nov. 21, 1916.

Application filed October 15, 1915. Serial No. 56,072.

*To all whom it may concern:*

Be it known that I, THOMAS STAMATSON, a citizen of the United States, residing at Brooklyn, in the county of Kings and State of New York, have invented new and useful Improvements in Automatic Signaling Devices, of which the following is a specification.

This invention relates to signaling devices and specifically to signals for automobiles or like vehicles and has for its primary object the provision of a signaling device which may be readily mounted upon the vehicle at the back thereof and provided with mechanical means which will be operative for the purpose of instantly notifying the driver of a vehicle in back of the vehicle containing the signaling device and enable him to control such movements of the vehicle as may be possible so as to avoid collision with the car ahead.

A still further object of the invention resides in the provision of a signaling device which may be automatically controlled through operation, respectively of the clutch and brake mechanism of the vehicle.

Another object of the invention resides in the provision of a signaling device which will include distinctively colored display surfaces which are successively rendered visible on operating the clutch and brake mechanism of the vehicle.

A still further object of the invention resides in the provision of a signaling device which will include distinctively colored normally invisible members which may be successively moved to display positions and means for automatically illuminating said members.

A still further object of the invention resides in the provision of a signaling device which may be applied to the vehicle without necessitating any material changes in the construction thereof, and one which, when applied will occupy but comparatively little space upon the vehicle and in no way destroy the ornamental character of the vehicle.

In the drawings forming a part of this specification and in which like reference numerals indicate similar parts in the several views:—Figure 1 is a rear elevation of a vehicle illustrating the application of the signaling device thereto. Fig. 2 is a side view of the device. Fig. 3 is a similar view looking toward the opposite side thereof. Fig. 4 is a vertical section therethrough showing parts in full lines. Fig. 5 is a horizontal section taken on the line 5—5 of Fig. 4.

In carrying the invention into practice, provision is made of a suitable casing 1 adapted to be secured in any suitable well known manner to the body of the vehicle at the rear end thereof and positioned thereon in a manner such as that shown in Fig. 1 of the drawings. Rising from the casing are fixed supporting posts 2 and 3, each supporting a signaling member 4 consisting of companion arms 5—5. The signaling members 4 of each of the posts 2 and 3 are identical in construction with one another and as illustrated, the arms 5—5 of said members are pivotally connected at 6 with the posts and in order that the arms of each member may be simultaneously moved, they are connected together by a suitable link 7. The arms 5—5 are of the same uniform width and their pivots 4 are superposed so that when the arms are adjusted to inactive or normal position they will be wholly disposed at the back of the supporting posts 2 and 3 to be concealed thereby. Each of these signaling members has its lower arm 5 provided with an actuating cable 8 or the equivalent thereof which is extended in the direction of the casing 1 so as to be freely movable through the passage 9 in the top wall of the casing as shown in Fig. 4. The lower end of the cable is connected to a vertically sliding rack bar 10 whose teeth intermesh with the teeth of a relatively large gear wheel 11 loose on a shaft 12, the latter being fixed at suitable points in the casing 1. The shaft 12 is also provided with a small gear wheel 13 having its teeth intermeshing with a horizontally movable rack bar 14. The said gear wheel 13 is fixedly secured to the wheel 11 so as to rotate therewith. The sliding rack bars 14 are respectively connected to the clutch and brake levers 15 and 16 as illustrated in Fig. 5 and incident to the manner of mounting the gear wheels 11 and 13 upon the fixed shaft 12, it follows, that the respective signaling members 4 are adapted to be successively operated.

The arms 5—5 which are controlled through movements of the clutch lever 15 bear a color such as green so that when the said arms are operatively extended to the position shown in Fig. 2, they will be clearly visible to the driver of a vehicle at the back of the vehicle carrying the signaling device, thus cautioning him that in succession of the projection of the green signaling arms 5—5 to the active position shown in Fig. 2, the arms 5—5 of the member 4 which are controlled through the brake lever 16 will be immediately presented to a full display position. The said arms 5—5 of the other signaling member 4 bear the color red as an absolute signal that the driver intends to bring his car to an immediate standstill. The companion sets of arms forming the two signaling members 4—4 will be automatically controlled through the usual successive operation of operating the clutch lever and then in turn operating the brake lever and the driver of a car behind will be fully warned to speed his vehicle in accordance with such visual indications as may be set up upon the vehicle ahead.

The arms 5—5 of each of the members 4 are adapted to normally rest against a stop 30 upon the supporting post of the arms under the action of a suitable spring 31.

In order that the distinctively colored display surfaces of the arms 5—5 forming the respective signaling devices 4 may be automatically illuminated at night time, it is preferred that each of said members 4 be provided with a lamp 17 of a color harmonizing with the display surfaces to be illuminated and as illustrated in Fig. 4, said lamp is arranged in an electric circuit 18 having a manually operated switch 19 which may be opened or closed at the desire of the operator. One terminal of the circuit has connection with a fixed element 20 forming part of a circuit closure and it is preferred that said element be arranged in close proximity to the fixed element 21 of said circuit closure to which the terminal 22 of the electric circuit is connected. The circuit is closed automatically by a rack bar 23 which measures with a gear wheel 24, loosely mounted upon a fixed shaft 25. Fixed to the gear 24 through a sleeve 26 is a gear wheel 27 over which the rack bar 14 is adapted to freely travel. The rack bar 23 is provided with a metallic actuating section 28 which is insulated as at 29 from the remaining section of the bar 23. It will now be observed that on movement of the rack bar 14, to actuate the bar 10, the bar 23 will be moved in a vertical direction so as to cause the section 28 thereof to pass over and contact with the element 21 and then in turn come in contact with the element 20 to thereby complete the electric circuit and cause the lamp to light as will be understood.

What is claimed as new is:—

A signal comprising a casing, a spring pressed arm pivotally mounted thereon, a rack bar movably mounted in the casing and connected with the arm, a gear wheel journaled in the casing and meshing with the said rack bar, a second gear wheel fixed to the first mentioned gear wheel, a shaft journaled in the casing, gear wheels mounted on said shaft, a rack bar meshing with the second mentioned gear wheel and one of the gear wheels on the said shaft, a lever operated means for moving the second mentioned rack bar, and a circuit closing rack bar movably mounted in the casing and meshing with one of the other gear wheels on the shaft.

In testimony whereof I affix my signature in presence of two witnesses.

THOMAS STAMATSON.

Witnesses:
  ANNA V. DOYLE,
  GEO. A. BYRNE.